United States Patent
Schoeneck et al.

(10) Patent No.: US 11,735,981 B2
(45) Date of Patent: Aug. 22, 2023

(54) ELECTRICAL MACHINE WITH AN INTEGRATED MEASUREMENT PRINTED CIRCUIT BOARD

(71) Applicant: Robert Bosch GmbH, Stuttgart (DE)

(72) Inventors: Marie-Luies Schoeneck, Grossbottwar (DE); Michael Mayer, Reutlingen (DE); Patrick Fruehauf, Besigheim (DE); Wolfram Kienle, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 17/512,956

(22) Filed: Oct. 28, 2021

(65) Prior Publication Data
US 2022/0140705 A1    May 5, 2022

(30) Foreign Application Priority Data
Oct. 29, 2020  (DE) .......................... 102020213570.3

(51) Int. Cl.
*H02K 11/27* (2016.01)
*H02K 3/50* (2006.01)
*H02K 5/15* (2006.01)

(52) U.S. Cl.
CPC ............... *H02K 11/27* (2016.01); *H02K 3/50* (2013.01); *H02K 5/15* (2013.01); *H02K 2203/09* (2013.01); *H02K 2211/03* (2013.01)

(58) Field of Classification Search
CPC ........ H02K 11/27; H02K 11/01; H02K 11/25; H02K 11/33; H02K 11/30; H02K 3/50; H02K 5/15; H02K 11/215; H02K 2203/06; H02K 2211/03; H02K 2203/09
USPC .......................................................... 310/71
See application file for complete search history.

(56) References Cited

U.S. PATENT DOCUMENTS

| 2014/0176124 | A1* | 6/2014 | Okumura | G01R 1/04 324/156 |
| 2014/0184212 | A1* | 7/2014 | Yamaguchi | G01R 15/207 324/244 |
| 2019/0229640 | A1* | 7/2019 | Aichriedler | G01R 15/202 |
| 2021/0152057 | A1* | 5/2021 | Noguchi | G01R 15/207 |
| 2022/0194210 | A1* | 6/2022 | Takahashi | H02K 7/085 |

FOREIGN PATENT DOCUMENTS

| DE | 102008022369 A1 | 11/2009 | |
| EP | 3306325 A1 * | 4/2018 | ............. G01D 3/024 |
| WO | 2020114773 A1 | 6/2020 | |

\* cited by examiner

*Primary Examiner* — Alexander A Singh
(74) *Attorney, Agent, or Firm* — Michael Best & Friedrich, LLP

(57) ABSTRACT

An electrical machine includes an interconnection assembly that creates contact for a stator of the electrical machine, a busbar that creates contact for the interconnection assembly, a measurement printed circuit board that is arranged perpendicularly to an axis of rotation of the electrical machine, on a side of the interconnection assembly that is averted from the stator, wherein a field sensor is arranged on the measurement printed circuit board, and a flux concentrator that engages around the busbar and the field sensor.

20 Claims, 2 Drawing Sheets

ELECTRICAL MACHINE WITH AN INTEGRATED MEASUREMENT PRINTED CIRCUIT BOARD

BACKGROUND

Modern high-voltage inverters for electrical axial drives are usually implemented in the form of add-on inverters in the casing of an electric motor. In this case, current measurement electronics are usually arranged, with associated flux concentrators, in a dedicated assembly. The current sensors and the busbars carrying the current to be measured are usually parallel to one another. Additionally, an interconnection assembly that creates electrical contact between the inverter-side motor phases and the stator core is typically situated in an electrical drive.

DE 102008022369 A1 thus discloses, for example, an electric motor in which a Hall sensor for measuring a current is arranged on a printed circuit board that is arranged behind an end shield of the associated electric motor. Furthermore, WO 2020/114773 A1 discloses a brushless electric motor in which a Hall board is arranged on an end shield of the electric motor.

SUMMARY

The electrical machine according to the invention comprises an interconnection assembly that creates contact for a stator of the electrical machine, a busbar that creates contact for the interconnection assembly, a measurement printed circuit board that is arranged perpendicularly to an axis of rotation of the electrical machine, on a side of the interconnection assembly that is averted from the stator, wherein a field sensor is arranged on the measurement printed circuit board, and a flux concentrator that engages around the busbar and the field sensor.

The electrical machine is preferably an electric motor, a generator or an electrical machine that can be operated as an electric motor or generator. The interconnection assembly creates contact for the stator of the electrical machine. This means that the interconnection assembly creates contact for the electrical windings of the stator. The interconnection assembly therefore in particular establishes electrical contact between the inverter-side motor phases and the stator core. In this case, a busbar creates contact for the interconnection assembly. The busbar here is typically one busbar of a plurality of busbars, wherein the different busbars create contact for different windings of the stator. The electrical machine therefore preferably comprises a plurality of busbars that create contact for the interconnection assembly to provide or tap off currents with different phases at the interconnection assembly.

The measurement printed circuit board is arranged perpendicularly to an axis of rotation of the electrical machine. This means that the measurement printed circuit board essentially extends in a plane that is perpendicular to the axis of rotation of the electrical machine. In this case, the axis of rotation is an axis about which a rotor of the electrical machine rotates. A field sensor, by way of which an electrical current that flows through the busbar can be measured, is arranged on the measurement printed circuit board. The electrical current is in this case measured indirectly by way of an electromagnetic field that is caused by the current and is recorded by the field sensor. The field sensor is therefore preferably arranged in the vicinity of the busbar. In particular, the measurement printed circuit board also comprises measurement electronics, which are preferably of an analog or digital configuration, in order to ascertain on the basis of the values recorded by the field sensor a current that flows through the busbar. The field sensor is a sensor by way of which an electrical and/or magnetic field can be measured. Therefore, the field sensor is in particular a magnetic field sensor, in particular a Hall sensor.

Preferably, a plurality of busbars create contact for the interconnection assembly and an associated field sensor is arranged on the measurement printed circuit board for each of the busbars in order to measure a current in the associated busbar. Therefore, in particular, each busbar is assigned exactly one field sensor that is arranged in the vicinity of the associated busbar on the measurement printed circuit board.

The flux concentrator engages around the busbar and the field sensor. As a result, a magnetic field that is generated by a flow of current through the busbar is directed onto the field sensor. The flux concentrator is therefore manufactured from a material that allows a magnetic flux within the flux concentrator. Preferably, the flux concentrator is manufactured from a metallic material.

The busbar, the measurement printed circuit board and the flux concentrator in this case preferably form components of the interconnection assembly. In other words, this means that the interconnection assembly, together with the busbar, the measurement printed circuit board and the flux concentrator, are mechanically connected to one another without one of these components being connected to the other components via a housing of the motor, so as to position the components relative to one another.

In a method for producing the electrical machine, an interconnection assembly is preferably first manufactured and then the interconnection assembly is arranged in the electrical machine, in particular on the stator of the electrical machine.

The interconnection assembly preferably comprises an insulating holding element that extends along the busbar, wherein the holding element is arranged between the busbar and the flux concentrator. This creates an insulator which prevents an electrical current that is passed through the busbar from flowing through the flux concentrator. This therefore avoids a high current flowing into a region that is created only for handling low currents, as is the case, for example, with the circuits provided on the measurement printed circuit board.

The flux concentrator is preferably fastened to the holding element. As a result of the fact that both the flux concentrator and the insulating holding element are arranged on the interconnection assembly, a structural unit is created and it is not absolutely necessary for individual components, for example the flux concentrator, to be arranged on the housing or in the housing of the inverter unit.

It is also advantageous if the flux concentrator comprises a U-shaped metal plate, wherein the U shape lies in the plane of the measurement printed circuit board, such that the flux concentrator engages around the busbar and the field sensor. In this case, a U shape is a shape that has a base region from which two arms extend at a particular angle in each case. Preferably, the flux concentrator is fastened to the holding element in the base region of the U-shaped metal plate. Such a U-shaped design of the flux concentrator allows an electromagnetic field to be carried particularly efficiently, as a result of which the field sensor can record a current flowing through the busbar particularly precisely.

The flux concentrator preferably has two bends, each having an internal angle of between 80° and 110°, to form the U shape. In particular, the flux concentrator has two bends, each having an internal angle of 90°. As a result, it is made possible, on the one hand, for the field sensor to be engaged around efficiently and at the same time also for the measurement printed circuit board to be arranged in the inner region of the U-shaped flux concentrator. The base region of the U-shaped metal plate is preferably a planar region, which allows particularly efficient fixing to the holding element that preferably also lies on the busbar in a planar manner. In this case, planar means that the flux concentrator does not have a curve in this region.

Also preferably, the flux concentrator has a multiplicity of stacked elements. The flux concentrator is therefore in particular a U-shaped element that is manufactured from a multiplicity of stacked laminations. Each individual one of the stacked elements preferably has a U shape. The magnetic flux properties of the flux concentrator are therefore improved.

It is also advantageous if the measurement printed circuit board has a respective receptacle on opposite sides of the field sensor, wherein the flux concentrator extends into the receptacles in the plane of the measurement printed circuit board. In this case, the measurement printed circuit board has the receptacles on its outer circumference. The flux concentrator can therefore be arranged particularly close to the field sensor, as a result of which the measurement properties of the field sensor are improved. In other words, this means that the measurement printed circuit board is shaped in such a way that it can be inserted into the space that the flux concentrator engages around, although the flux concentrator and the measurement printed circuit board lie in a common plane. The measurement printed circuit board therefore in particular has a region that forms a negative with respect to the U shape of the flux concentrator.

It is also advantageous if the busbar extends perpendicularly to the measurement printed circuit board in the region of the flux concentrator. A particularly compact design is therefore made possible.

It is also advantageous if the measurement printed circuit board is arranged in an end shield attachment of the electrical machine. In this case, the end shield attachment is in particular a region that is located within a housing of the electrical machine, but is on a side of the stator of the electrical machine on which an end shield, in particular a B end shield, of the electrical machine is also located. The end shield attachment is preferably created by a structural element that comprises the end shield of the electrical machine that is on a side from which contact is also created with the stator.

More preferably, an end shield is arranged between the stator and the interconnection assembly. In this case, the end shield is in particular a B end shield, wherein the end shield is also preferably designed to bear the interconnection assembly and/or the measurement printed circuit board. The measurement printed circuit board and/or the flux concentrator are therefore optionally fastened to the end shield.

The measurement printed circuit board is preferably arranged on the interconnection assembly or the end shield. Preferably, a multiplicity of busbars create contact for the interconnection assembly, wherein a multiplicity comprises at least two busbars. In this case, an associated field sensor is preferably arranged on the measurement printed circuit board for each of the busbars and the measurement printed circuit board is in particular designed to carry out current measurement for each of the busbars by means of the field sensors. In this case, the electrical machine furthermore preferably comprises a number of flux concentrators that also corresponds to the number of busbars. Also preferably, the electrical machine comprises a number of flux concentrators and field sensors that corresponds to a number of phases of the electrical machine.

BRIEF DESCRIPTION OF THE DRAWING

Exemplary embodiments of the invention are described in detail below with reference to the accompanying drawing, in which.

DETAILED DESCRIPTION

Figure 1:
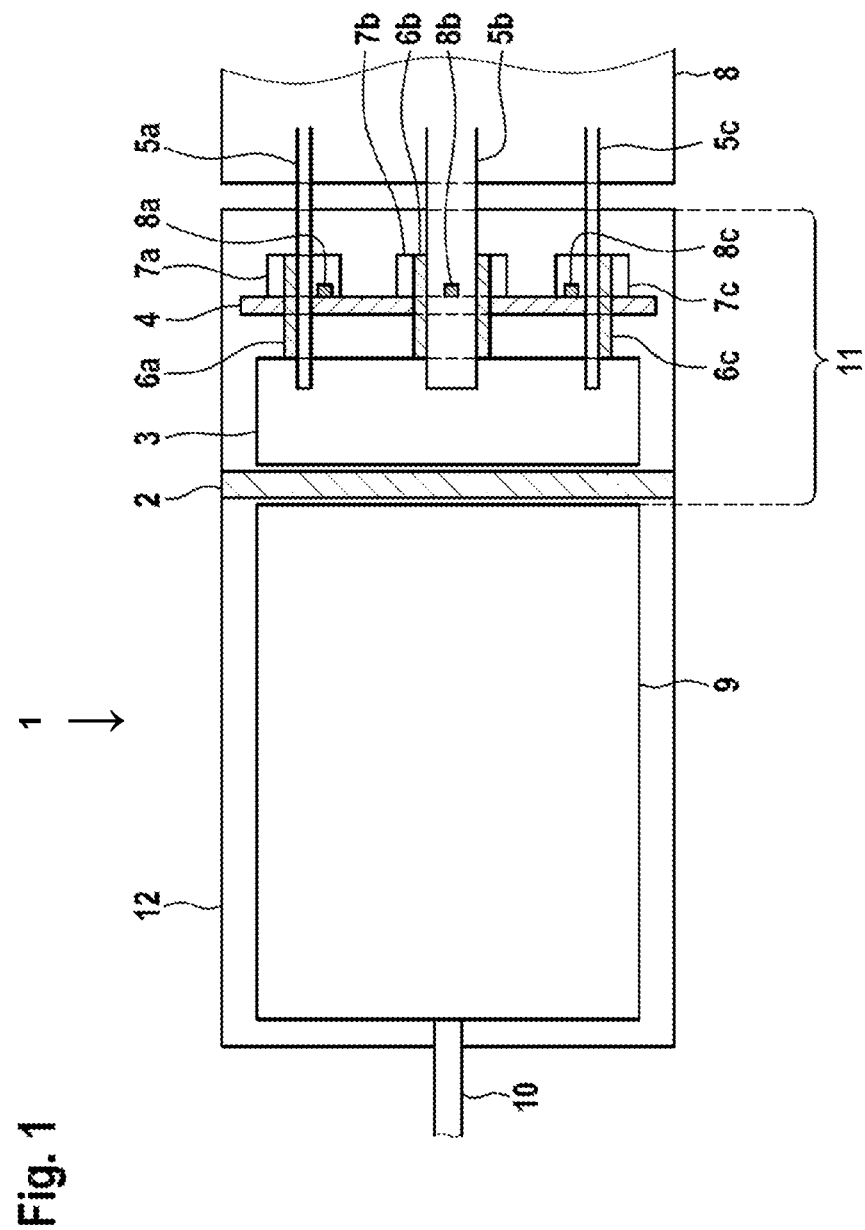
FIG. 1 is a schematic illustration of an electrical machine according to the invention.

FIG. 1 shows an electrical machine 1 according to an embodiment of the invention. In this case, the electrical machine 1 is an electric motor.

A stator 9 is arranged in a housing 12 of the electrical machine 1. The stator 9 surrounds a rotor that is connected to a rotary axle 10 of the electrical machine. The rotary axle 10 rotates about an axis of rotation of the electrical machine 1. The rotor of the electrical machine 1 is mounted on one side of the stator 9 on an end shield 2. This end shield 2 is also referred to as a B end shield. An interconnection assembly 3 that creates contact for the stator 9 of the electrical machine 1 is furthermore arranged on that side of the stator 9 on which the end shield 2 is also arranged. The stator 9 is therefore in particular connected to an associated inverter by way of the interconnection assembly 3.

In the exemplary embodiment shown in FIG. 1, the end shield 2 is arranged between the stator 9 and the interconnection assembly 3. However, it is pointed out that in alternative embodiments the interconnection assembly 3 is arranged between the stator 9 and the end shield 2.

The stator 9 comprises a plurality of winding strands that are supplied with currents of different phase to operate the electrical machine 1. These currents are typically generated by an inverter and are provided to the electrical machine 1 by way of a multiplicity of busbars 5a, 5b, 5c. The electrical machine 1 therefore has, for example, a first busbar 5a, a second busbar 5b and a third busbar 5c that connect to the interconnection assembly 3 to create contact for the interconnection assembly 3. Optionally, the busbars 5a, 5b, 5c are part of the interconnection assembly 3. The currents of different phase are fed by an inverter to the interconnection assembly 3 via the multiplicity of busbars 5a, 5b, 5c. The currents of different phase are fed to the winding strands of the stator 9 through the interconnection assembly 3.

To allow efficient operation of the electrical machine 1, it is advantageous if a current that flows through the first busbar 5a, the second busbar 5b and/or the third busbar 5c is measured. In this embodiment of the invention, this is carried out by means of a measurement printed circuit board 4 on which a first field sensor 8a, a second field sensor 8b and a third field sensor 8c are arranged. In this case, the first field sensor 8a is designed to measure a current that flows through the first busbar 5a. The second field sensor 8b is designed to measure a current that flows through the second busbar 5b. The third field sensor 8c is designed to measure a current that flows through the third busbar 5c. In this case, each of the field sensors 8a, 8b, 8c measures a respective magnetic field that is generated by the flow of current through the associated busbar 5a, 5b, 5c. The field sensors 8a, 8b, 8c are therefore Hall sensors, for example. Electronics needed for current measurement by way of the field sensors 8a, 8b, 8c are likewise arranged on the measurement printed circuit board 4. It is pointed out that, in this embodiment of the invention, a current is measured at each of the busbars 5a, 5b, 5c. Alternatively, the current is however measured only at some of the busbars 5a, 5b, 5c, but at least at one of the busbars 5a, 5b, 5c.

The measurement printed circuit board 4 is arranged perpendicularly to the axis of rotation of the electrical machine 1, on a side of the interconnection assembly 3 that is averted from the stator 9. The axis of rotation of the electrical machine 1 in this case corresponds to an alignment of the rotary axle 10. Such an alignment of the measurement printed circuit board 4 allows a compact design of the electrical machine 1. The measurement printed circuit board 4 is fastened directly to the interconnection assembly 3 and/or the end shield 2.

Figure 2:
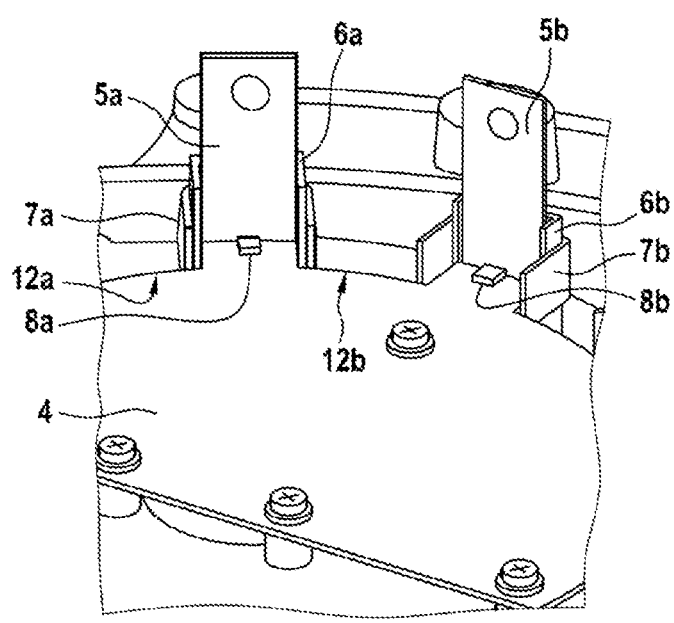
FIG. 2 is a schematic illustration of a measurement printed circuit board arranged in the electrical machine.

The interconnection assembly 3 comprises a first insulating holding element 6a that extends along the first busbar 5a, wherein the first holding element 6a is arranged between the first busbar 5a and a first flux concentrator 7a. The interconnection assembly 3 also comprises a second insulating holding element 6b that extends along the second busbar 5b, wherein the second holding element 6b is arranged between the second busbar 5b and the second flux concentrator 7b. The interconnection assembly 3 also comprises a third insulating holding element 6c that extends along the third busbar 5c, wherein the third holding element 6c is arranged between the third busbar 5c and a third flux concentrator 7c. In this case, each of the flux concentrators 7a, 7b, 7c engages around exactly one of the busbars 5a, 5b, 5c and the respectively associated field sensor 8a, 8b, 8c. This is illustrated by way of example in FIG. 2. FIG. 2 shows a view of a detail in which the first busbar 5a and the second busbar 5c are illustrated together with the associated field sensors 8a, 8b and the associated flux concentrators 7a, 7b. The design according to the invention of the electrical machine 1 will be described in more detail below on the basis of the first busbar 5a, the first flux concentrator 7a and the first field sensor 8a. The second busbar 5b, the second field sensor 8b and the second flux concentrator 7a are arranged in a corresponding manner. This also applies to the third busbar 5c, the third field sensor 8c and the third flux concentrator 7c.

As is also shown in FIG. 2, the first busbar 5a extends perpendicularly to the measurement printed circuit board 4 in the region of the first flux concentrator 7a. Here, the measurement printed circuit board 4 adjoins the first busbar 5a, wherein there is preferably only a small gap, or no gap, between the measurement printed circuit board 4 and the first busbar 5a. The first holding element 6a that extends parallel to the busbar 5a is arranged on a side of the first busbar 5a that is averted from the measurement printed circuit board 4. The first holding element 6a is part of the interconnection assembly 3. The interconnection assembly 3 therefore has three concentric metal rings, for example, wherein the busbars extend from these rings. The first insulating holding element 6a is formed, for example, in one piece with an insulating ring, by way of which two of the concentric rings are separated and insulated from one another.

The first flux concentrator 7a is fastened to the first holding element 6a. In this case, the first flux concentrator 7a in this embodiment is a U-shaped metal plate, wherein the U shape lies in the plane of the measurement printed circuit board 4, such that the first flux concentrator 7a engages around the first busbar 5a and the first field sensor 8a. A part of the measurement printed circuit board 4 and the first field sensor 8a are therefore arranged in the interior of the "U" formed by the first flux concentrator 7a. The first flux concentrator 7a therefore has a base region from which two arms of the U-shaped region extend. The base region is fixed to the first holding element 6a, wherein the first flux concentrator 7a is fixed on a side of the first holding element 6a that is a side averted from the first busbar 5a. The first flux concentrator 7a is insulated from the first busbar 5a by way of the first holding element 6a. The current flowing through the first busbar 5a therefore cannot flow into the first flux concentrator 7a.

In the embodiment shown, the first flux concentrator 7a has two bends to form the desired U shape. In this case, the flux concentrator 7a has two bends, each having an internal angle of 90°, to form the U shape. In alternative embodiments, this angle can however also be chosen differently, wherein in each case an internal angle of between 80 and 110° is advantageous. To make it possible for the first field sensor 8a to be engaged around by the first flux concentrator 7a without the measurement printed circuit board 4 obstructing an arrangement of the first flux concentrator 7a, the measurement printed circuit board 4 has a respective receptacle 12a, 12b on opposite sides of the first field sensor 8a. For example, the measurement printed circuit board 4 therefore has a first receptacle 12a and second receptacle 12b that are on different sides of the first field sensor 8a, wherein the arms of the U-shaped first flux concentrator 7a extend into the receptacles 12a, 12b. In this case, a first arm of the U-shaped first flux concentrator 7a extends into the first receptacle 12a and a second arm of the U-shaped first flux concentrator 7a extends into the second receptacle 12b.

In this embodiment, the first flux concentrator 7a is, for example, formed by a U-shaped bent lamination. In alternative embodiments, the flux concentrator 7a has a multiplicity of stacked elements. For example, the first flux concentrator 7a is created from a multiplicity of stacked laminations that each have a U shape. Optionally, each of the flux concentrators 7a, 7b, 7c is of a structurally identical configuration. Therefore, in particular, each of the flux concentrators 7a, 7b, 7c is configured in such a way that each of the flux concentrators 7a, 7b, 7c comprises a multiplicity of stacked elements.

The measurement printed circuit board 4, together with the flux concentrators 7a, 7b, 7c and the field sensors 8a, 8b, 8c, is arranged in an end shield attachment of the electrical machine 1. Therefore, the measurement printed circuit board 4, together with the associated sensors, is arranged within a housing 12 of the electrical machine. The end shield attachment 11 here is a part of the electrical machine 1 that comprises the end shield 2 and extends in a part of the electrical machine 1 that is located on a side of the stator 9 on which the interconnection assembly 3 is also located.

This therefore achieves a high level of integration of components and functions, as a result of which, for example, present component parts and assemblies can be dispensed with. For example, the machine 1 according to the invention is therefore suitable for recording the currents flowing through the busbars 5a, 5b, 5c in a respective measurement value and providing the same. Electronics arranged in the vicinity of the electrical machine 1 can therefore be made in a compact manner since they do not need measurement electronics to record the currents that flow through the busbars 5a, 5b, 5c. Such measurement components that are typically located outside of the electrical machine 1 are therefore integrated in already existing assemblies, as a result of which the number of required tools is minimized and assembly is made easier. In this case, the field sensors 8a, 8b, 8c are current sensors based on the Hall effect.

The measurement printed circuit board 4 is optionally assembled directly onto the B end shield of the electrical machine 1 that is preferably situated in the end shield attachment of an inverter. The busbars 5a, 5b, 5c and therefore the motor phases are connected into the interconnection assembly 3, typically present in an electrical machine 1, at an angle of 90° with respect to the busbar 4. The flux concentrators 7a, 7b, 7c are fastened directly in a plastic holder of the interconnection assembly that in particular comprises the holding elements 6a, 6b, 6c. The field sensors 8a, 8b, 8c are preferably SMD-soldered and integrated on the measurement printed circuit board 4.

Besides the disclosure above, reference is explicitly made to the disclosure of FIGS. 1 and 2.

The invention claimed is:

1. An electrical machine (1), comprising
   an interconnection assembly (3) that creates contact for a stator (9) of the electrical machine (1),
   a busbar (5a) that creates contact for the interconnection assembly (3),
   a measurement printed circuit board (4) that is arranged perpendicularly to an axis of rotation of the electrical machine (1), on a side of the interconnection assembly (3) that is averted from the stator (9), wherein a field sensor (8a) is arranged on the measurement printed circuit board (4), and
   a flux concentrator (7a) that engages around the busbar (5a) and the field sensor (8a),
   wherein the flux concentrator (7a) comprises a U-shaped metal plate, wherein the measurement printed circuit board (4) lies in a plane, and wherein a section taken through the flux concentrator (7a) in the plane of the measurement printed circuit board is a U shape, such that the flux concentrator (7a) engages around the busbar (5a) and the field sensor (8a).

2. The electrical machine (1) according to claim 1, wherein the interconnection assembly (3) comprises an insulating holding element (6a) that extends along the busbar (5a), wherein the insulating holding element (6a) is arranged between the busbar (5a) and the flux concentrator (7a).

3. The electrical machine (1) according to claim 2, wherein the flux concentrator (7a) is fastened to the insulating holding element (6a).

4. The electrical machine (1) according to claim 1, wherein the flux concentrator (7a) has two bends, each having an internal angle of between 80 and 110 degrees, to form the U shape.

5. The electrical machine (1) according to claim 1, wherein the flux concentrator (7a) comprises a multiplicity of stacked elements.

6. The electrical machine (1) according to claim 1, wherein the measurement printed circuit board (4) has a respective receptacle (12a, 12b) on opposite sides of the field sensor (8), wherein the flux concentrator (7a) extends into the receptacles (12a, 12b) in the plane of the measurement printed circuit board (4).

7. The electrical machine (1) according to claim 1, wherein the busbar (5a) extends perpendicularly to the measurement printed circuit board (4) in a region of the flux concentrator (7a).

8. The electrical machine (1) according to claim 1, wherein the measurement printed circuit board (4) is arranged in an end shield attachment (11) of the electrical machine (1).

9. The electrical machine (1) according to claim 1, wherein an end shield (2) is arranged between the stator (9) and the interconnection assembly (3).

10. An electrical machine (1), comprising
    an interconnection assembly (3) that creates contact for a stator (9) of the electrical machine (1),
    a busbar (5a) that creates contact for the interconnection assembly (3),
    a measurement printed circuit board (4) that is arranged perpendicularly to an axis of rotation of the electrical machine (1), on a side of the interconnection assembly (3) that is averted from the stator (9), wherein a field sensor (8a) is arranged on the measurement printed circuit board (4), and
    a flux concentrator (7a) that engages around the busbar (5a) and the field sensor (8a),
    wherein an end shield (2) is arranged between the stator (9) and the interconnection assembly (3).

11. The electrical machine (1) according to claim 10, wherein the interconnection assembly (3) comprises an insulating holding element (6a) that extends along the busbar (5a), wherein the insulating holding element (6a) is arranged between the busbar (5a) and the flux concentrator (7a).

12. The electrical machine (1) according to claim 11, wherein the flux concentrator (7a) is fastened to the insulating holding element (6a).

13. The electrical machine (1) according to claim 10, wherein the flux concentrator (7a) comprises a multiplicity of stacked elements.

14. The electrical machine (1) according to claim 10, wherein the measurement printed circuit board (4) has a respective receptacle (12a, 12b) on opposite sides of the field sensor (8), wherein the flux concentrator (7a) extends into the receptacles (12a, 12b) in a plane of the measurement printed circuit board (4).

15. The electrical machine (1) according to claim 10, wherein the busbar (5a) extends perpendicularly to the measurement printed circuit board (4) in a region of the flux concentrator (7a).

16. An electrical machine (1), comprising
    an interconnection assembly (3) that creates contact for a stator (9) of the electrical machine (1),
    a busbar (5a) that creates contact for the interconnection assembly (3),
    a measurement printed circuit board (4) that is arranged perpendicularly to an axis of rotation of the electrical machine (1), on a side of the interconnection assembly (3) that is averted from the stator (9), wherein a field sensor (8a) is arranged on the measurement printed circuit board (4), and
    a flux concentrator (7a) that engages around the busbar (5a) and the field sensor (8a),
    wherein the measurement printed circuit board (4) is arranged in an end shield attachment (11) of the electrical machine (1).

17. The electrical machine (1) according to claim 16, wherein the interconnection assembly (3) comprises an insulating holding element (6a) that extends along the busbar (5a), wherein the insulating holding element (6a) is arranged between the busbar (5a) and the flux concentrator (7a).

18. The electrical machine (1) according to claim 17, wherein the flux concentrator (7a) is fastened to the insulating holding element (6a).

19. The electrical machine (1) according to claim 16, wherein the busbar (5*a*) extends perpendicularly to the measurement printed circuit board (4) in a region of the flux concentrator (7*a*).

20. An electrical machine (1), comprising
- an interconnection assembly (3) that creates contact for a stator (9) of the electrical machine (1),
- a busbar (5*a*) that creates contact for the interconnection assembly (3),
- a measurement printed circuit board (4) that is arranged perpendicularly to an axis of rotation of the electrical machine (1), on a side of the interconnection assembly (3) that is averted from the stator (9), wherein a field sensor (8*a*) is arranged on the measurement printed circuit board (4), and
- a flux concentrator (7*a*) that engages around the busbar (5*a*) and the field sensor (8*a*),
- wherein the measurement printed circuit board (4) has a respective receptacle (12*a*, 12*b*) on opposite sides of the field sensor (8), wherein the flux concentrator (7*a*) extends into the receptacles (12*a*, 12*b*) in a plane of the measurement printed circuit board (4).

\* \* \* \* \*